3,823,113
STABILIZED POLYVINYL ACETAL INTERLAYERS
Abraham J. Reisman, Springfield, Mass., assignor to
Monsanto Company, St. Louis, Mo.
No Drawing. Filed Oct. 27, 1972, Ser. No. 301,462
Int. Cl. C08f 45/58, 45/60
U.S. Cl. 260—45.8 N                        6 Claims

ABSTRACT OF THE DISCLOSURE

Disclosed herein are polyvinyl acetal resins, suitable for use as interlayers for pellucid laminates which contain a synergistic mixture of 2,6-di-n-octadecyl-p-cresol stabilizers and an alkylated hydroxy phenyl benzotriazole.

BACKGROUND OF THE INVENTION

1. Field of the Invention

The present invention relates to polyvinyl acetal resins containing a synergistic stabilizer system. More particularly, the present invention relates to plasticized polyvinyl butyral interlayers containing a synergistic mixture of 2,6-di-n-octadecyl-p-cresol (hereinafter referred to as DOPC) and an alkylated hydroxy phenyl benzotriazole.

2. Description of the Prior Art

Stabilizer systems based on trialkyl phenols and/or benzotriazoles are well known in the prior art. These are taught in such U.S. Pats. as 2,862,908, 3,134,748, 3,201,-366, 3,238,178, 3,441,361, 3,450,552, 3,454,521, 3,454,523 and 3,454,525.

Notwithstanding the above references, a need has long existed in the polyvinyl butyral interlayer art for a system which would stabilize printed interlayer material against thermal degradation during the seasoning or normalizing step which follows the printing operation. During the seasoning step the freshly printed sheet is exposed to elevated temperatures for prolonged periods of time in order to diffuse the printing ink and obtain a sheet which is free from mottle. Most of the conventional stabilizer systems for the polyvinyl butyral sheet do not afford the desired amount of thermal stabilization during the seasoning step. Those that do provide the desired degree of stability usually introduce undesirable color.

Thus, there exists in the art a need for a thermal stabilizer system for plasticized polyvinyl butyral interlayer material which will provide an adequate degree of thermal stabilization without introducing any objectionable color into the sheet.

SUMMARY OF THE INVENTION

The present invention provides a solution to the aforementioned problem by providing a synergistic stabilizer system for plasticized polyvinyl butyral interlayer. This stabilizer system, which is based on DOPC and an alkylated hydroxy phenyl benzotriazole provides thermal stability during seasoning without the introduction of undesirable color.

DESCRIPTION OF THE PREFERRED EMBODIMENTS

The polyvinyl acetal resins which are employed in the present invention are well known in the art. These resins and processes for their preparation are described at length in Morrison et al. U.S. Pat. No. Re. 20,430, dated June 29, 1937, and Lavin et al. U.S. Pat. No. 2,496,480. In general, polyvinyl acetal resins made from saturated lower unsubstituted aliphatic aldehydes are the most suitable with polyvinyl acetal resins made from butyraldehyde being preferred for safety glass interlayers.

In general the polyvinyl acetal resins employed have Staudinger molecular weights ranging from about 50,000 to 600,000 and preferably from 150,000 to 270,000 and may be considered to be made up, on a weight basis, of from 5 to 3% hydroxyl groups, calculated as polyvinyl alcohol; 0 to 40% ester groups, preferably acetate groups; and the balance substantially acetal. When the acetal is butyraldehyde acetal, the polyvinyl acetal resin will preferably contain, on a weight basis, from 5 to 30% hydroxyl groups, calculated as polyvinyl alcohol and from 0 to 3% by ester, e.g., acetate groups, calculated as polyvinyl ester, the balance being substantially butyraldehyde acetal.

The polyvinyl acetal resin may be plasticized to the extent of about 20 to 80 parts plasticizer per hundred parts resin and more commonly between 40 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di-(beta-butoxyethyl)adipate. The resulting plasticized resin mixture is then generally extruded in the form of sheets and cut to size to produce the interlayers used in the present invention.

As stated above, one component of the stabilizer system is 2,6-di-n-octadecyl-p-cresol (DOPC) while the other component is an alkylated hydroxy phenyl benzotriazole. The preferred triazole compounds may be represented by the following general formula:

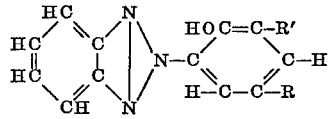

wherein R is an alkyl radical having 1 to 12 carbon atoms and R' is selected from the group consisting of hydrogen and alkyl radicals having 1 to 12 carbon atoms. Preferably, R is a methyl radical and R' is hydrogen.

The amount of DOPC used is in the range of from 0.07 to 0.8 parts by weight per hundred parts of resin (phr.) with 0.1 to 0.46 parts by weight per hundred parts of resin (phr.) being preferred. The amount of the benzotriazole component used is in the range of from 0.1 to 0.5 parts by weight per hundred parts of resin (phr.) with 0.15 to 0.35 parts by weight per hundred parts of resin (phr.) being preferred.

The DOPC and benzotriazole components may be added to the polyvinyl acetal resin separately or as a blend. They may be added to the resin before or during any of the normal resin processing operations such as washing, plasticization, etc. The stabilizer components may be added to any plasticizer used for the resin and thereby incorporated into the resin during the plasticization step. Alternately, they may be post added to any shaped articles fabricated from the resins using any of the conventional means known to those skilled in the art. Preferably, the stabilizers are present in the resin prior to any thermoforming or seasoning process.

During thermoforming or seasoning, thermally unstable resins will show a large change in resin viscosity indicating that the resin is undergoing heat degradation. Resins stabilized according to the teachings of the present invention retain at least 70% of their original viscosity. The test methods used to measure viscosity retention are described below.

Test Method A—Plastic Oxidation Test

One hundred parts of resin, 42 parts of triethylene glycol di(2-ethyl butyrate) plasticizer and the stabilizers being evaluated are blended in a flask to form a homogeneous system. The plasticized resin sample is then placed in a 130° C. air circulating oven for 45 minutes. A control sample is held at room temperature. The viscosities of the control sample and the heated sample are measured in a methanol solution containing 7½% resin solids. The viscosity measurements are carried out at 20° C. using an Oswald-Fenske Viscometer. The percent of viscosity retention on the heated sample is then calculated to give a measure of the thermal oxidative stability of the stabilized resin.

Test Method B—Viscosity Measurements on Sheet Material

One hundred parts of resin, 42 parts of triethylene glycol di(2-ethyl butyrate) plasticizer and the stabilizers being evaluated are blended in a Baker-Perkins mixer at 300° F. for 7 to 10 minutes to obtain a homogeneous mix which is pressed into a cake 2 x 4 x 6 inches. The cake is skived into sheets 30 mils thick and 3 inch diameter discs are cut out of the sheet. The discs are wrapped in aluminum foil and put into a dish where they are heated for 16 hours in a 90° C. air circulating oven. Viscosity measurements are run on the discs and on a control sample held at room temperature according to the procedures outlined above. The percent viscosity retention is then measured to give a measure of the thermal oxidative stability of the stabilized resin.

Percent Yellow Determination

The percent yellow values are determined using a 7.5% resin solution in methanol and a Klett-Summerson Photoelectric Colorimeter. The absorption is measured at 420 millimicrons with a blue filter and at 660 millimicrons with a red filter and the readings converted to percent transmission. Subtraction of the 420 millimicron reading from the 660 millimicron reading gives the percent yellow. These values indicate the amount of yellow color in the resin. The percent yellow termination in the preferred stabilized resins of the present invention is less than 18%.

Wherever possible abbreviations are used for the stabilizers referred to in the present specification. A list of these abbreviations and the compounds which they represent are set forth below:

DOPC=2,6-di-n-octadecyl-p-cresol
DBPC=ditertiary butyl para-cresol
PTAP=para tertiary amyl phenol
DIPC=di-isopropyl para-cresol
HMPB=2(2'-hydroxy-5'-methyl phenyl) benzotriazole The following examples are set forth in illustration of the present invention and should not be construed as a limitation thereof. Unless otherwise indicated all parts and percentages given in reference to resin compositions are by weight.

Each example uses a conventional polyvinyl butyral resin of the type used as the interlayer in laminated safety glass. The samples are prepared and tested according to the procedure outlined above.

EXAMPLES 1 TO 13

These examples are set forth as controls to show the percent viscosity retention and percent yellow that is obtained with conventional stabilizers for polyvinyl butyral resins. These stabilizers are used alone and not in combination in accordance with the present invention. The test results for this series are tabulated in Table I below.

TABLE I

Summary of Control Examples 1-13

| Example | Stabilizer | Concentration | Test method | Percent Viscosity retention | Percent Yellow color |
|---|---|---|---|---|---|
| 1 | None | | A | 25 | 13 |
| 2 | DOPC | 0.05 | A | 46 | 11 |
| 3 | DOPC | 0.1 | A | 59 | 11 |
| 4 | DOPC | 0.2 | A | 75 | 14 |
| 5 | DOPC | 0.4 | A | 56 | 20 |
| 6 | DOPC | 0.15 | A | 67 | (*) |
| 7 | DOPC | 0.2 | B | 70 | (*) |
| 8 | PTAP | 0.2 | B | 50 | 11 |
| 9 | DIPC | .1 | A | 72 | 20 |
| 10 | DIPC | .16 | A | 74 | 21 |
| 11 | HMPB | .25 | A | 25 | (*) |
| 12 | HMPB | .1 | A | (*) | (*) |
| 13 | HMPB | .6 | A | 20 | 17 |

*Test not run.

Control Example 1, which contains no stabilizers, is used as a reference point. Examples 2 to 10 contain thermal stabilizers but no benzotriazole compound. Examples 11 to 13 contain a benzotriazole compound but no co-stabilizer as is required by the practice of the present invention. For the most part the percent viscosity retention of the control samples is very low and the percent yellow observed in Examples 5, 9 and 10 is unacceptably high.

EXAMPLES 14 TO 19

The following examples illustrate the preferred embodiments of the present invention wherein a synergistic mixture of DOPC stabilizer and a benzotriazole (HMPB) is used to stabilize the plasticized polyvinyl butyral resin. The results for this series is tabulated in Table II below.

TABLE II

Summary of Examples 14 to 19

| Example | Additive | Concentration | Test method | Percent Viscosity retention | Percent Yellow color |
|---|---|---|---|---|---|
| 14 | DOPC / HMPB | .05 / 0.25 | A | 65 | 14 |
| 15 | DOPC / HMPB | .1 / 0.25 | A | 82 | 15 |
| 16 | DOPC / HMPB | .2 / 0.25 | A | 85 | 16 |
| 17 | DOPC / HMPB | .43 / 0.25 | A | 88 | 17 |
| 18 | DOPC / HMPB | .66 / 0.25 | A | 88 | 16.5 |
| 19 | DOPC / HMPB | .2 / .6 | A | 75 | 20 |

The data in the foregoing table for Examples 15 to 18 illustrate the improved percent viscosity retention that is obtained in the practice of the present invention. A comparison of these examples with the Control Examples 1 to 7 and 11 to 13 shows the synergistic results that are obtained with the stabilizer systems of the present invention. Examples 14 and 19 further illustrate the need for observing the prescribed ranges for the additives in order to maximize viscosity retention and to minimize undesirable color in the resin.

CONTROL EXAMPLES 20 TO 27

Examples 20 to 27 are additional control examples to illustrate the use of a benzotriazole with other thermal stabilizers which are conventionally used with polyvinyl butyral. The results for this series is tabulated in Table III below.

TABLE III

Summary of Examples 20 to 27

| Example | Additive | Concentration | Test method | Percent Viscosity retention | Yellow color |
|---|---|---|---|---|---|
| 20 | DIPC / HMPB | .1 / 0.25 | A | 70 | 20 |
| 21 | DIPC / HMPB | .16 / 0.25 | A | 77 | 20.5 |
| 22 | PTAP / HMPB | .1 / 0.25 | A | 35 | 12.5 |
| 23 | PTAP / HMPB | .17 / .25 | A | 40 | 14 |
| 24 | PTAP / HMPB | .2 / .25 | A | 50 | 15 |
| 25 | DBPC / HMPB | .1 / .25 | A | 87 | 18 |
| 26 | DBPC / HMPB | .2 / .25 | A | 90 | 18 |
| 27 | DBPC / HMPB | .3 / .25 | A | 97 | 20 |

Examples 20, 21 and 25 to 27 indicate that while some systems provide an acceptable level of viscosity retention, the percent yellow in the stabilized sheet is at an unacceptable level. Examples 22 to 24 show systems which will give an acceptable percent yellow but do not exhibit acceptable percent viscosity retention.

EXAMPLES 28–29

Samples of sheet stabilized in accordance with the practice of the present invention (Example 16) and sheet stabilized with a system of the prior art (Example 24) were printed with a conventional ink in order to obtain a color gradient of the type normally found in automobile windshields. The printed sheets were then heated at 100° C. for up to 24 hours. Visual and instrumental observation of the heated sheets clearly indicate that the ink in the sheet stabilized according to the present invention (Example 16) showed significantly greater heat stability than that ink which was printed on the sheet stabilized in accordance with procedures of the prior art (Example 24).

These results indicate an unexpected benefit is obtained when using the synergistic stabilizers of the present invention in that the properties of ink used to print the sheet, as well as the sheet properties themselves, are improved.

Laminated safety glass for use as glazing units prepared from polyvinyl butyral interlayers stabilized with the synergistic mixtures of the present invention were found to have good physical and optical properties. These glazing units find wide spread use in vehicle and architectural applications. The present invention also contemplates the use of the stabilized polyvinyl butyral sheet material as interlayers for laminates wherein rigid sheets of a transparent plastic material is used to form the laminate. Examples of a transparent plastic material would include poly(methyl methacrylate), polystyrene, polycarbonate, polyurethane, polyvinyl chloride, nitrile polymers, etc.

From the foregoing it should be apparent that many modifications and variations may be made in the present invention without departing from the spirit and scope thereof.

What is claimed is:

1. A plasticized polyvinyl butyral interlayer which has been printed with a dye and heated to an elevated temperature to diffuse the dye which interlayer is stabilized with from 0.07 to 0.8 parts, per hundred parts of polyvinyl butyral of 2,6-di-n-octadecyl-p-cresol and from 0.1 to 0.5 parts, per hundred parts of polyvinyl butyral, of an alkylated hydroxyl phenyl benzotriazole corresponding to the following general formula:

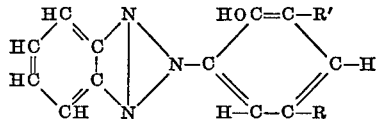

wherein R is an alkyl radical 1 to 12 carbon atoms and R' is selected from the group consisting of hydrogen and alkyl radicals having 1 to 12 carbon atoms.

2. The interlayer of Claim 1 wherein the alkylated hydroxy phenyl benzotriazole is 2(2'-hydroxy-5'-methyl phenyl) benzotriazole.

3. The interlayer of Claim 1 wherein the amount of 2,6-di-n-octadecyl-p-cresol is in the range of from 0.1 to 0.46 parts per hundred parts of resin.

4. The interlayer of Claim 2 wherein the amount of 2(2'-hydroxy-5'-methyl phenyl) benzotriazole is in the range of from 0.15 to 0.35 parts per hundred parts of resin.

5. Laminated safety glass wherein the interlayer is a plasticized polyvinyl butyral which has been printed with a dye and heated to an elevated temperature to diffuse the dye which interlayer is stabilized with from 0.07 to 0.8 parts, per hundred parts of polyvinyl butyral, of 2,6-di-n-octadecyl-p-cresol and from 0.1 to 0.5 parts, per hundred parts of polyvinyl butyral, of an alkylated hydroxy phenyl benzotriazole corresponding to the following general formula:

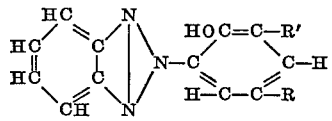

wherein R is an alkyl radical having 1 to 12 carbon atoms and R' is selected from the group consisting of hydrogen and alkyl radicals having 1 to 12 carbon atoms.

6. The interlayer of Claim 5 wherein the alkylated hydroxy phenyl benzotriazole is 2(2'hydroxy-5'-methyl phenyl) benzotriazole.

References Cited

UNITED STATES PATENTS

| | | | |
|---|---|---|---|
| 2,195,122 | 3/1940 | Nordlander | 260—73 |
| 2,862,908 | 12/1958 | Jones et al. | 260—45.95 |
| 3,201,366 | 8/1965 | Magnotta | 260—45.8 |
| 3,218,216 | 11/1965 | Gall | 252—300 |
| 3,238,178 | 3/1966 | Kibler et al. | 260—45.85 |
| 3,368,997 | 2/1968 | Gordon | 260—45.8 |
| 3,493,633 | 2/1970 | Lange | 260—857 |
| 3,522,143 | 7/1970 | Motter | 161—199 |
| 3,644,594 | 2/1972 | Mont et al. | 260—901 |

OTHER REFERENCES

Booklet of Shawinigan Resins Corp., "Butvar"/"Formvar," 1963, pp. 7–10.

DONALD E. CZAJA, Primary Examiner

RALPH A. WHITE, Assistant Examiner

U.S. Cl. X.R.

161—199; 260—45.95 H, 73 L

UNITED STATES PATENT OFFICE
CERTIFICATE OF CORRECTION

Patent No. 3,823,113    Dated July 9, 1974

Inventor(s) Abraham J. Reisman

It is certified that error appears in the above-identified patent and that said Letters Patent are hereby corrected as shown below:

At Column 2, line 11, "3%" should read --- 30% ---.

At Column 4, line 17, Example 6, Test Method "A" should read --- B ---.

At Column 6, line 51, under References Cited, United States Patent "3,218,216" should read --- 3,218,261 ---.

Signed and sealed this 1st day of October 1974.

(SEAL)
Attest:

McCOY M. GIBSON JR.
Attesting Officer

C. MARSHALL DANN
Commissioner of Patents